(12) United States Patent
Akkarakaran et al.

(10) Patent No.: US 11,729,735 B2
(45) Date of Patent: *Aug. 15, 2023

(54) TIMING ADJUSTMENTS WITH MIXED NUMEROLOGIES

(71) Applicant: QUALCOMM Incorporated, San Diego, CA (US)

(72) Inventors: Sony Akkarakaran, Poway, CA (US); Peter Gaal, San Diego, CA (US); Muhammad Nazmul Islam, Littleton, MA (US); Amir Aminzadeh Gohari, Sunnyvale, CA (US); Peter Pui Lok Ang, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/318,668

(22) Filed: May 12, 2021

(65) Prior Publication Data
US 2021/0266855 A1 Aug. 26, 2021

Related U.S. Application Data

(63) Continuation of application No. 16/284,045, filed on Feb. 25, 2019, now Pat. No. 11,019,590.
(Continued)

(51) Int. Cl.
H04W 56/00 (2009.01)
H04L 5/00 (2006.01)
(Continued)

(52) U.S. Cl.
CPC ....... H04W 56/0045 (2013.01); H04L 5/0094 (2013.01); H04L 27/2607 (2013.01);
(Continued)

(58) Field of Classification Search
CPC ......... H04W 56/0045; H04W 56/0015; H04W 72/0446; H04L 5/001; H04L 5/0094; H04L 27/2607
See application file for complete search history.

(56) References Cited

U.S. PATENT DOCUMENTS 10,750,494 B2 * 8/2020 Chen .................... H04L 5/0048
11,019,590 B2 * 5/2021 Akkarakaran ...... H04L 27/2607
(Continued)

FOREIGN PATENT DOCUMENTS

WO 2016160330 A1 10/2016

OTHER PUBLICATIONS

Qualcomm Incorporated: "Remaining Details on Timing Advance Granularity and Adjustment Consideration", 3GPP Draft, R1-1802817, 3rd Generation Partnership Project (3GPP), Mobile competence Centre, 650 Route Des Lucioles, F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051398229, 5 Pages, Retrieved from the Internet: URL:http://www.3gpp.org/ftp/tsg%5Fran/WG1%5FRL1%5F92/Docs/ [retrieved on Feb. 17, 2018], Chapter 2, Chapter 3.
(Continued)

Primary Examiner — Benjamin H Elliott, IV
(74) Attorney, Agent, or Firm — Qualcomm Incorporated

(57) ABSTRACT

Certain aspects of the present disclosure relate to communication systems, and more particularly, to interpreting a timing advance (TA) command for members of a timing advance group (TAG), such as different uplink component carriers and/or different bandwidth parts, having different numerologies, such as different subarrier spacing (SCS). A method that may be performed by a user equipment (UE) includes receiving, from a base station (BS), a TA command. The UE interprets the TA command differently for different
(Continued)

members of a same TAG, associated with different numerologies. The UE applies a timing adjustment when transmitting an uplink transmission to the BS based, at least in part, on the interpretation.

28 Claims, 10 Drawing Sheets

Related U.S. Application Data

(60) Provisional application No. 62/654,182, filed on Apr. 6, 2018, provisional application No. 62/636,026, filed on Feb. 27, 2018.

(51) Int. Cl.
  *H04L 27/26* (2006.01)
  *H04W 72/0446* (2023.01)

(52) U.S. Cl.
  CPC ... *H04W 56/0015* (2013.01); *H04W 72/0446* (2013.01); *H04L 5/001* (2013.01)

(56) References Cited

U.S. PATENT DOCUMENTS

| | | | |
|---|---|---|---|
| 2018/0262313 A1* | 9/2018 | Nam | H04L 5/0044 |
| 2018/0279358 A1* | 9/2018 | Babaei | H04W 72/14 |
| 2019/0053182 A1* | 2/2019 | Choi | H04W 56/0045 |
| 2019/0082408 A1* | 3/2019 | Kim | H04W 56/005 |
| 2019/0104554 A1* | 4/2019 | Amuru | H04L 5/0007 |
| 2019/0268869 A1* | 8/2019 | Akkarakaran | H04W 56/0045 |
| 2020/0007292 A1* | 1/2020 | Huang | H04B 7/0695 |
| 2021/0266855 A1* | 8/2021 | Akkarakaran | H04L 27/2607 |

OTHER PUBLICATIONS

Qualcomm Incorporated: "Summary of Remaining Details on RACH Procedure",3GPP Draft, R1-1803289, 3rd Generation Partnership Project (3GPP), Mobile competence Centre, 650, Route Des Lucioles, F-06921 Sophia-Antipolis Cedex , France, vol. RAN WG1, No. Athens, Greece, Feb. 26, 2018-Mar. 2, 2018, Feb. 26, 2018 (Feb. 26, 2018), XP051398409, 29 Pages, Retrieved from the Internet:URL:http://www.3gpp.org/ftp/tsg%5Fran/WG1%5FRL1/TSGR1%5F92/Docs/ [retrieved on Feb. 26, 2018], Chapter 3.4, Chapter 7.

Samsung: "Corrections on Timing Advance", 3GPP TSG RAN WG1 Meeting #92, R1-1801954, Athens, Greece, Feb. 26, 2018-Mar. 2, 2018, 2018, 4 pages.

Fujtsu: "Discussion on Ambigurty about TA Determination in case or Multiple Configured UL BWPS with Different Numerologies", 3GPP Draft, R1-1801891 TA Determination With Different Numerologies Final, 3rd Generation Partnership Project (3GPP), Mobile Competence Centre, 650, Route Des Lucioles, F-06921 Sophia-Antipolis Cede, vol. RAN WG1, No. Athens, Greece, Feb. 26, 2018-Mar. 2, 2018, Feb. 16, 2018 (Feb. 16, 2018), XP051397049, 3 Pages.

Huawei et al., "Summary of Remaining Issues on NR CA", 3GPP Draft, R1-1801348, 3rd Generation Partnership Project (3GPP), Mobile Competence Centre, 650, Route Des Lucioles , F-06921 Sophia-Antipolis Cedex, France, vol. RAN WG1, No. Athens, Greece, Feb. 26, 2018-Mar. 2, 2018, Feb. 17, 2018 (Feb. 17, 2018), XP051397512, 7 Pages, Retrieved from the Internet: URL:http://www.3gpp.org/ftp/tsg%5Fran/WG1%5FRL1/TSGR1%5F92/Docs/ [retrieved on Feb. 17, 2018], Chapter 5.1, Chapter 5.2.

International Search Report and Written Opinion—PCT/US2019/019536—ISA/EPO—dated May 9, 2019.

Nokia., et al., "Summary of Remaining Details on RACH Procedure", 3GPP TSG-RAN WG1 #NR1801, R1-1801169, Vancouver, BC, Canada, Jan. 22-26, 2018, 51 Pages.

* cited by examiner

800

| Subcarrier Spacing (kHz) of the first uplink Transmission after RAR | TA Unit |
|---|---|
| 15 | 16*64 Ts |
| 30 | 8*64 Ts |
| 60 | 4*64 Ts |
| 120 | 2*64 Ts |

FIG. 8

TIMING ADJUSTMENTS WITH MIXED NUMEROLOGIES

CLAIM OF PRIORITY

This application is a continuation of U.S. patent application Ser. No. 16/284,045, filed on Feb. 25, 2019, which claims benefit of and priority to U.S. Provisional Patent Application Ser. No. 62/636,026, filed Feb. 27, 2018; and U.S. Provisional Patent Application Ser. No. 62/654,182, filed Apr. 6, 2018, the entire contents of which are herein incorporated by reference in their entireties as if fully set forth below and for all applicable purposes.

FIELD OF THE DISCLOSURE

Aspects of the present disclosure relate to wireless communications, and more particularly, to techniques for timing advance (TA) commands for uplink communications with mixed numerologies.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a user equipment (UE). The method generally includes receiving, from a base station (BS), a timing advance (TA) command. The method generally includes interpreting the TA command differently for different members of a same timing advance group (TAG). The members of the TAG are associated with different numerologies. The method generally includes applying a timing adjustment when transmitting an uplink transmission to the BS based, at least in part, on the interpretation.

Certain aspects provide an apparatus for wireless communication. The apparatus generally includes means for receiving, from another apparatus, a TA command. The apparatus generally includes means for interpreting the TA command differently for different members of a same TAG. The members of the TAG are associated with different numerologies. The apparatus generally includes means for applying a timing adjustment when transmitting an uplink transmission to the other apparatus based, at least in part, on the interpretation.

Certain aspects provide an apparatus for wireless communication. The apparatus generally includes a receiver configured to receive, from another apparatus, a TA command. The apparatus generally includes at least one processor coupled with a memory and configured to interpret the TA command differently for different members of a same TAG. The members of the TAG are associated with different numerologies. The apparatus generally includes a transmitter configured to apply a timing adjustment when transmitting an uplink transmission to the other apparatus based, at least in part, on the interpretation.

Certain aspects provide a computer readable medium having computer executable code stored thereon for wireless communication. The computer readable medium generally includes code for receiving, from a BS, a TA command. The computer readable medium generally includes code for interpreting the TA command differently for different members of a same TAG. The members of the TAG are associated with different numerologies. The computer readable medium generally includes code for applying a timing adjustment when transmitting an uplink transmission to the BS based, at least in part, on the interpretation.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 8 is a table showing example timing advance (TA) units for different subcarrier spacing, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
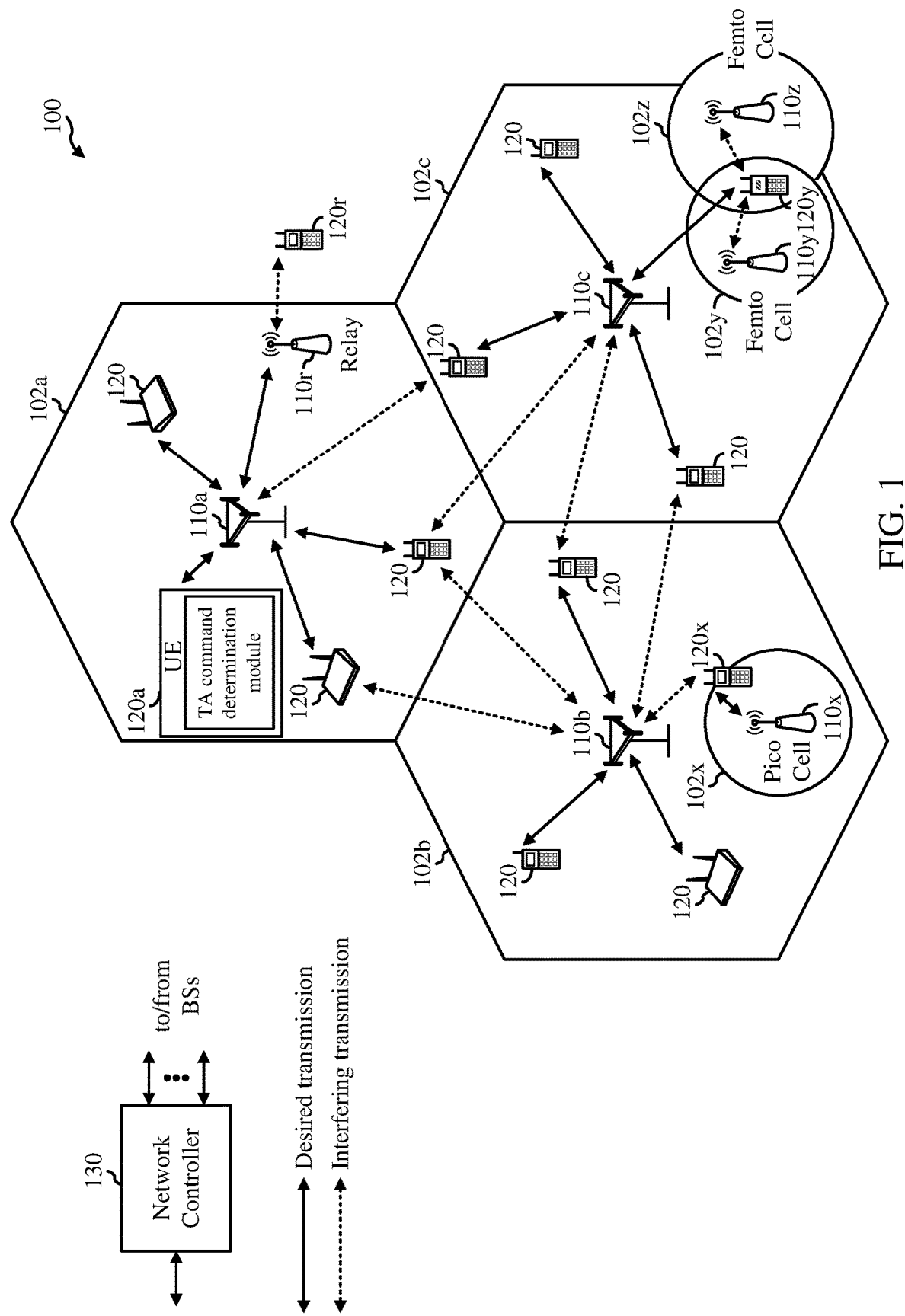
FIG. 1 is a block diagram conceptually illustrating an example telecommunications system, in accordance with certain aspects of the present disclosure.

Aspects of the present disclosure provide apparatus, methods, processing systems, and computer readable mediums for timing adjustment with mixed numerologies.

In certain systems (e.g., 5G NR systems), timing advance (TA) commands are issued by a base station (BS) to the user equipment (UE). The TA commands may be determined in an effort to ensure that uplink transmissions from the UE(s) arrive at the BS synchronously and are orthogonal to each other. In some examples, an UL transmission from a UE located close to the BS may have a shorter round trip time (RTT) as compared to a UE located farther away from the BS. The TA commands may be determined in an effort to enable to the BS to receive and process UL signaling using a single fast Fourier transform (FFT) window.

As a UE moves further away from the BS, the RTT increases. Thus, the TA commands from the BS may not ensure synchronization. In absence of adjustments by the UE, the time at which UL transmissions from the UE arrive at the BS may start to lag behind other UEs that are located closer to the BS. To compensate for the difference in RTT, the BS sends the TA command to adjust the UE's timing.

In certain systems, such certain long term evolution (LTE) systems, the TAs are of a fixed granularity that is a function of the LTE subcarrier spacing (e.g., 15 kHz). As LTE supports a single SCS, the fixed granularity may be thought of as a constant. Other wireless communication systems, such as 5G NR systems, support mixed numerologies for UL transmissions. As described herein, numerology refers to a set of parameters that define a structure of time and frequency resources used for communication. Such parameters may include, for example, the subcarrier spacing, type of cyclic prefix (e.g., such as normal CP or extended CP), and transmission time intervals (TTIs) (e.g., such as subframe or slot durations). A single TA command may apply to an entire timing adjustment group (TAG); however, members of the TAG may be associated with a different numerologies. Accordingly, UEs may not be able to apply a same TA granularity to all UL transmissions.

Aspects of the present disclosure provide techniques and apparatus for determining TA granularity (e.g., for a received TA command) among uplink carriers that have mixed (e.g., different) UL numerologies. As discussed above, 5G NR, for example, may support mixed numerologies across cells with carrier aggregation and across bandwidth parts (BWPs), or subbands, within a cell. Using aspects presented herein, the UE may determine the TA to use for UL transmission, based in part on the numerology associated with one or more of the uplink carriers and/or numerology associated with one or more supported uplink bandwidth parts.

In some examples, in accordance with aspects described herein, a UE receives a TA command, interprets the TA command based on a numerology associated with an UL transmission, and applies a timing adjustment when transmitting UL signaling to the BS based, at least in part, on the interpreted TA. The same TA command may have a different impact on different members of a TAG. Advantageously, this allows UL signaling having mixed numerology system to arrive at a BS in a synchronous (e.g., time-aligned) manner through application of a same TA command.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless communication network 100 may be a New Radio (NR) or 5G network. A UE 120 in the wireless communication network 100 may receive a timing advance (TA) command from a BS 110 in the wireless communication network 100. The UE 120 may interpret the TA command based on a numerology associated with an uplink transmission (or associated with the UE). For example, as shown in FIG. 1, the UE 120a has a TA command determination module configured to interpret the TA command, in accordance with certain aspects of the present disclosure. The UE 120 may apply a timing adjustment when transmitting uplink signaling to the BS 110. The timing adjustment applied by the UE 120 may be based, at least in part, on the interpreted TA. The same TA command may have a different impact on (and may be interpreted differently by) different members of a timing advance group (TAG).

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
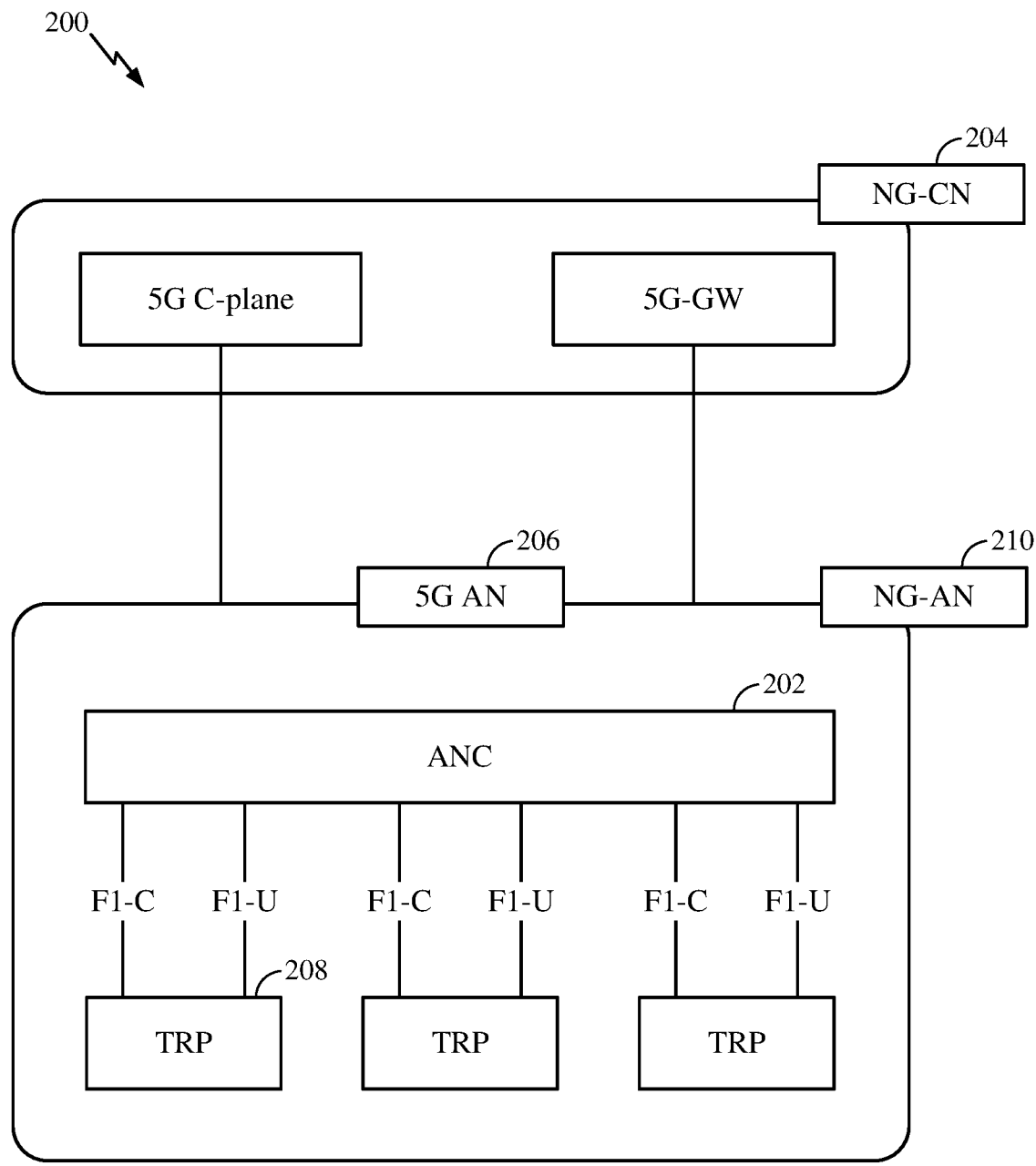
FIG. 2 is a block diagram illustrating an example logical architecture of a distributed radio access network (RAN), in accordance with certain aspects of the present disclosure.

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more TRPs 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
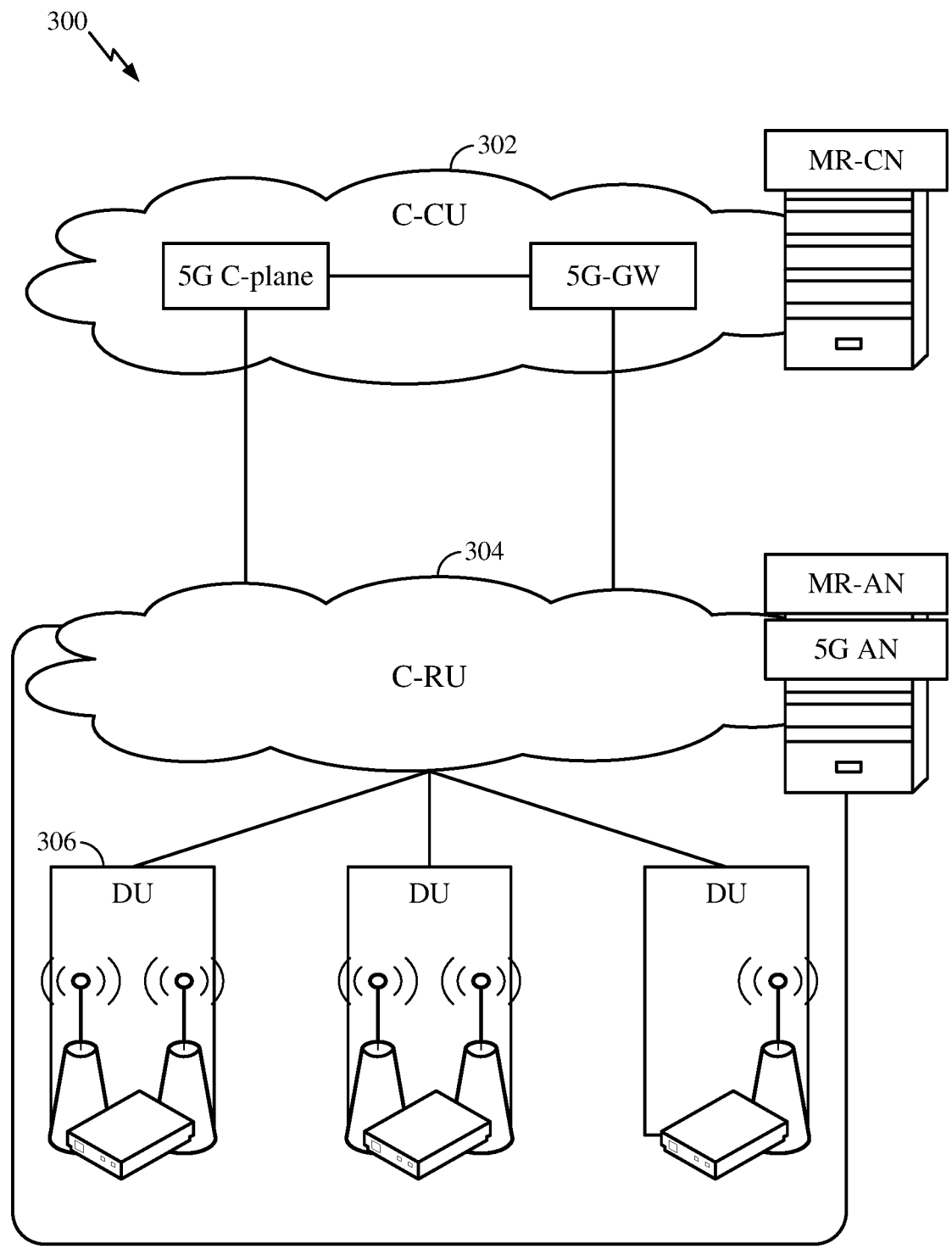
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
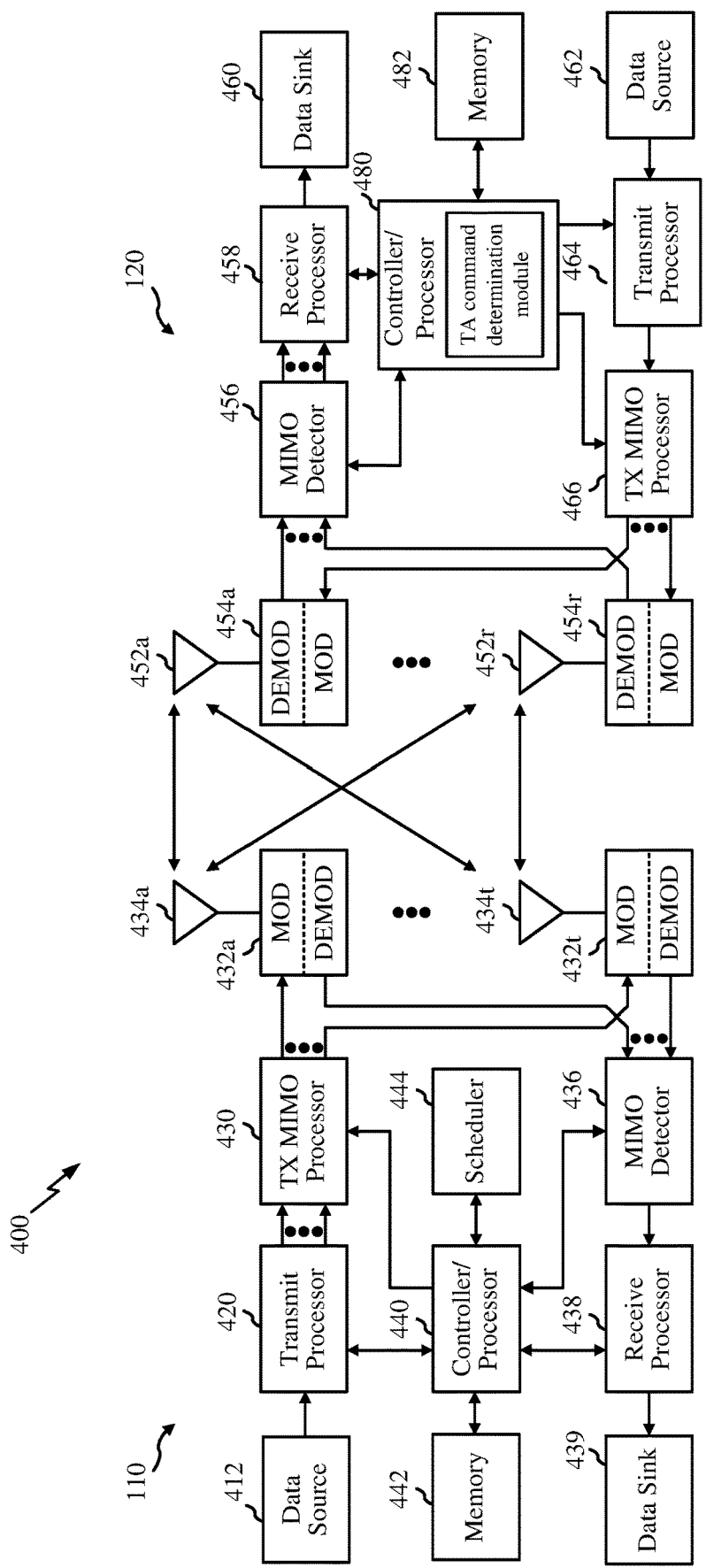
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein and illustrated with reference to FIG. 9. For example, as shown in FIG. 4, the controller/processor 480 has a TA command determination module configured to interpret the TA command, in accordance with certain aspects of the present disclosure.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DE-MODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
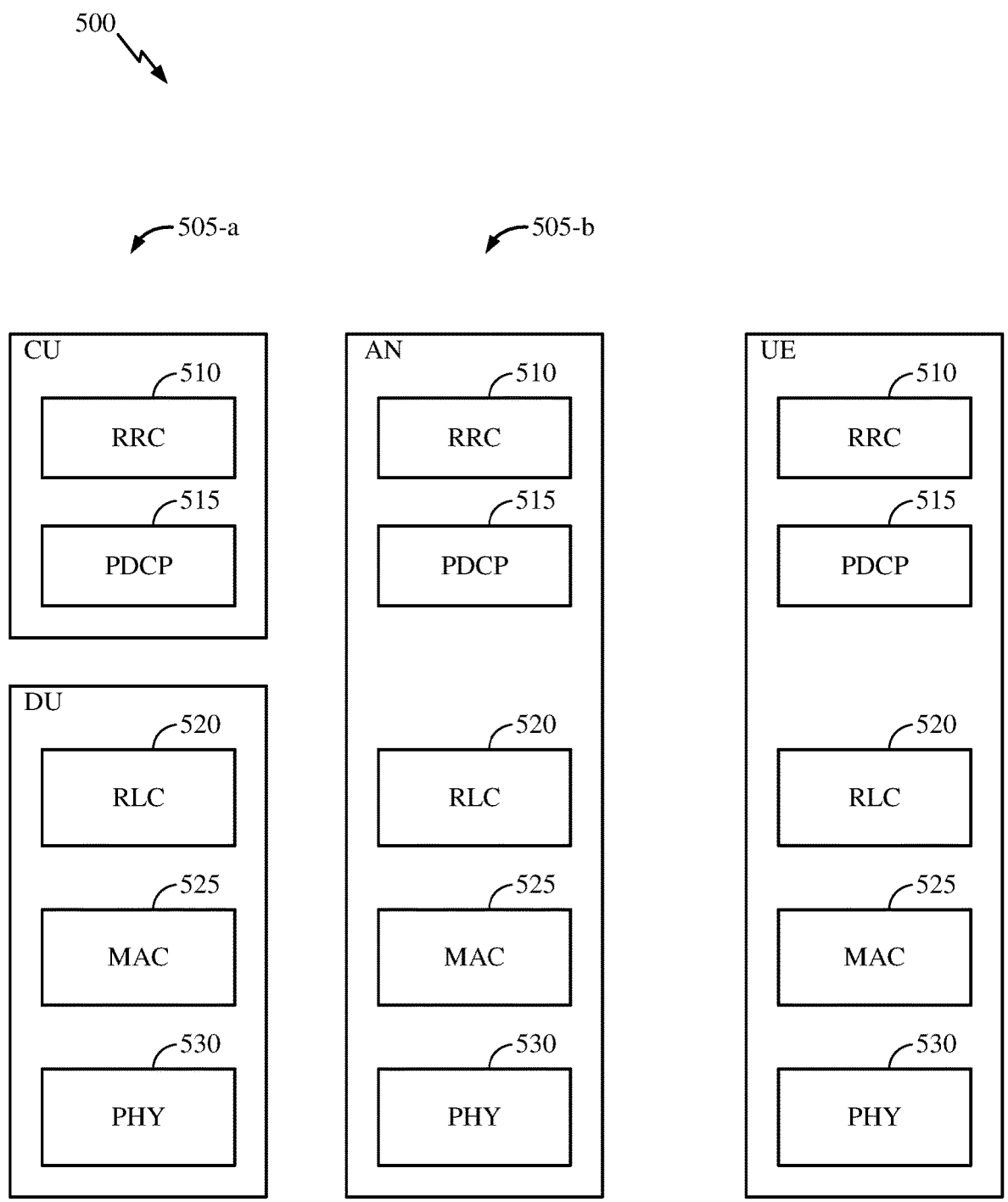
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a RRC layer 510, a PDCP layer 515, a RLC layer 520, a MAC layer 525, and a PHY layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
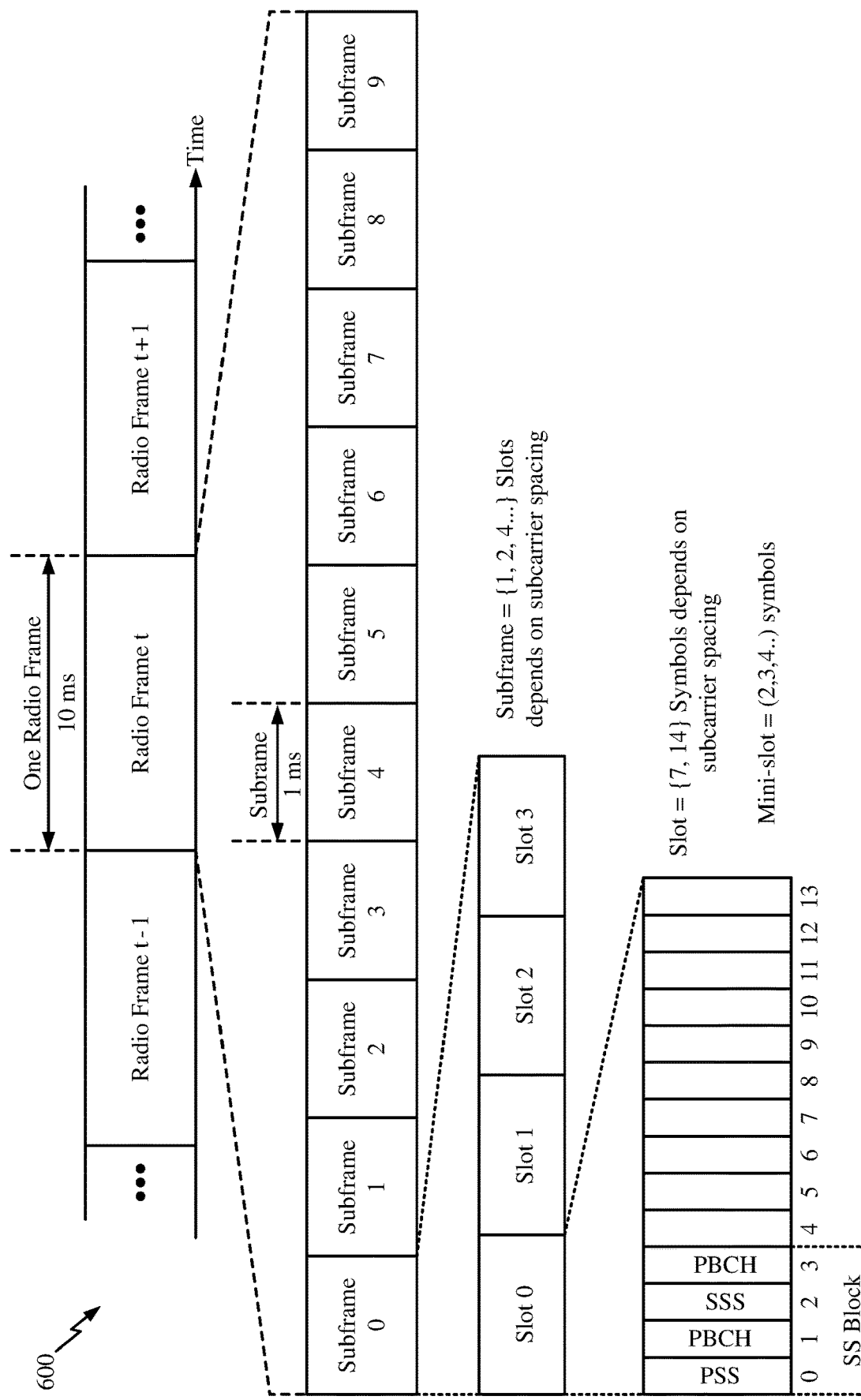
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

Example Supplemental Uplink

Certain wireless communication system deployments utilize multiple downlink (DL) component carriers (CCs) as part of a carrier aggregation (CA) scheme. For example, in addition to a primary DL CC, one or more supplemental DL (SDL) CCs may be used to enhance date throughput and/or reliability.

Figure 7:
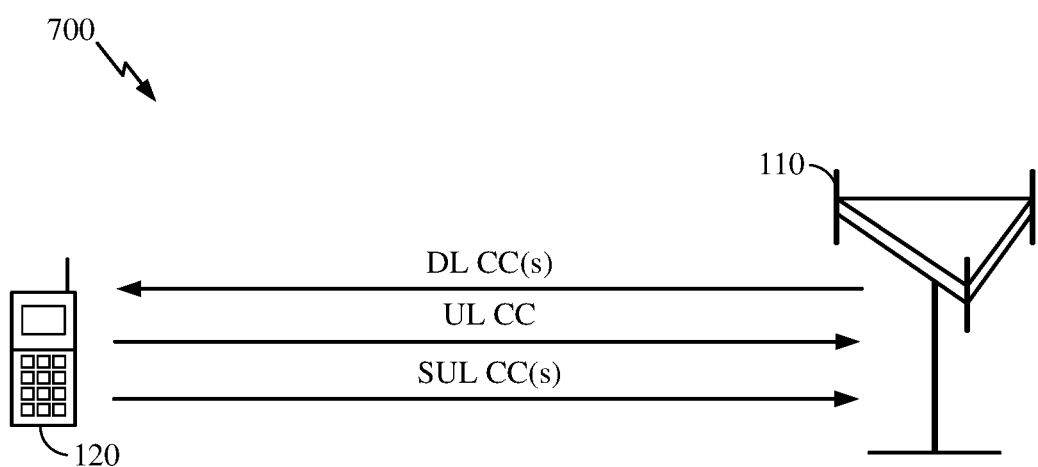
FIG. 7 illustrates an example scenario with supplemental uplink (SUL) component carriers, in accordance with certain aspects of the present disclosure.

As illustrated in FIG. 7, for certain systems (e.g., such as 5G NR), one or more supplemental UL (SUL) CCs may also be utilized. A SUL may generally refer to an UL CC without a corresponding DL CC (e.g., no paired DL) in the cell. In other words, SUL may generally refer to the case when there is only UL resource for a carrier from the perspective of an NR device. As shown in FIG. 7, SUL may allow for a scenario where there is a one DL CC and multiple UL CCs in a cell. In some cases, there may be a one-to-multiple relationship between DL and UL. When cells are co-located, the SUL and primary UL (PUL) may belong to the same timing advance group (TAG).

In NR, UE specific RRC signaling may (re)-configure the location of PUCCH either on the SUL carrier or on a non-SUL UL carrier in a SUL band combination. The default location of the PUSCH may be the same carrier that is used by PUCCH. Further, UE specific RRC signaling may (de)-configure that PUSCH be dynamically scheduled on the other (i.e., non-PUCCH) carrier in the same cell as the SUL. In this case, a carrier indicator field (CIF) in the UL grant may be used to indicate (e.g., dynamically) whether the PUSCH is transmitted on the PUCCH carrier or on the other carrier. There may be one active bandwidth part (BWP) on the SUL carrier and one active BWP on the non-SUL UL carrier.

SRS related RRC parameters may be independently configured for SRS on the SUL carrier and SRS on the non-SUL UL carrier in the SUL band combination. For example, SRS can be configured on the SUL carrier and non-SUL UL carrier, regardless of the carrier configuration for PUSCH and PUCCH.

Example TA Granularity for UL with Different Numerologies

For uplink transmission, a timing advance (TA) is generally used to ensure that signals from different UEs arrive at the base station (e.g., a gNB) synchronously (e.g., are orthogonal) to avoid performance loss. Typically, the amount of the TA, also referred to as the TA command, is signaled from the gNB to the UE. For example, the gNB may signal the TA in a medium access control (MAC) control element (CE) of the random access response (RAR) during a random access procedure. After receiving the RAR, the UE may send a first uplink transmission based on the TA. For example, the UE applies a timing adjustment to the uplink transmission based on the TA.

In NR, the TA granularity (e.g., the units of the TA command) is generally based on one or more parameters associated with the numerology of the uplink carrier. As used herein, the term numerology generally refers to a set of parameters that define a structure of time and frequency resources used for communication. Such parameters may include, for example, subcarrier spacing (SCS), type of cyclic prefix (e.g., such as normal CP or extended CP), and transmission time intervals (TTIs) (e.g., such as subframe or slot durations).

In one reference example shown in the Table 800 in FIG. 8, the TA granularity (TA unit) is based on the subcarrier spacing of the first uplink transmission after RAR. As shown, the unit of the TA (e.g., the TA granularity) scales with the subcarrier spacing (e.g., an aspect of the numerology) for the single numerology case (e.g., in the case where one or more uplink carriers have the same numerology).

In some cases, NR may support mixed numerologies across cells with carrier aggregation and/or across BWP(s) within a cell. In some examples, a PUL and SUL, which may belong to the same TAG, may have different numerologies. In some examples, one or more UL BWPs of the carrier(s) within the cell can have different numerologies. In scenarios where the uplink within the cell has a mixed numerology, the gNB (using conventional techniques) may not be able to accurately determine the TA granularity to use for TA command(s).

According to certain aspects, the gNB may determine a TA configuration (e.g., TA granularity) for a TA command among uplink carriers associated with mixed (different) UL numerologies. The BS to share the same TA command across uplink carriers (e.g., PUL and SUL) with different numerologies.

In some aspects, the BS may determine the TA configuration to use for the TA command, based on the TA granularity used for each of the uplink carriers. Assuming PUL and SUL are the uplink carriers, the BS may determine a TA granularity of the PUL CC (e.g., based on the numerology used for PUL CC), and determine a TA granularity of the SUL CC (e.g., based on the numerology used for PUL CC). The BS may determine the TA granularity of the TA command based on the determined TA granularity of both the PUL CC and SUL CC. For example, in one aspect, the BS may determine the TA granularity to use for the TA command based on a maximum or minimum of the TA granularity of SUL TA and TA granularity of PUL TA.

In some aspects, the BS may determine the TA granularity of the TA command based on the numerology of the PUCCH carrier. For example, the base station may determine which of the uplink carriers is associated with a PUCCH, and determine the TA granularity of the TA command based on the TA granularity of the determined uplink carrier associated with PUCCH.

In some aspects, the BS may determine one of the uplink carriers that is associated with a particular carrier index (e.g., index zero, or the minimum or the maximum among all the uplink carrier indices, or a specific index indicated by RRC configuration), and determine the TA granularity of the TA command based on the TA granularity of the determined uplink carrier. The index of each carrier itself may be configured or reconfigured, for example, by RRC signaling, and this may provide a method of changing the TA granularity when needed.

In some aspects, the BS may determine the TA granularity based on a "reference" carrier explicitly configured by the network. For example, the base station may receive an indication of one of the uplink carriers to use for the TA granularity of the TA command, and determine the TA granularity of the TA command based on the TA granularity of the indicated uplink carrier.

As noted above, NR may also support different numerologies across different portions of bandwidth (or BWPs within one or more carriers of the cell. That is, a cell encompassing UL may be configured with multiple UL BWPs with different numerologies. The BWP may be defined by a particular frequency range, center frequency, and/or numerology. Although the CC can include multiple BWP configurations, in general there is a single BWP that is active at any given time. However, the active UL BWP may dynamically change (e.g., based on DCI).

Thus, if TA granularity is based on the numerology of the current active UL BWP, then the TA granularity would also have to dynamically change any time the current active UL BWP changes. However, because the BWP switch command (used to switch the active UL BWP) is based on DCI and the TA command is based on MAC CE, the base station may have to align the timing of the BWP switch command and MAC CE command in order to ensure that the correct TA granularity is used for the current active UL BWP.

According to certain aspects, the BS may achieve timing alignment between the TA command (e.g., based on MAC-CE) and BWP switching command (e.g., based on DCI).

In an illustrative example, a BWP1 and a BWP2 (for a single carrier) have different numerologies. When the MAC-CE command is decoded (e.g., by a UE), the TA granularity is dependent on the BWP which is active at that time instance. However, a timing ambiguity can result at this time instance. For example, even though the MAC-CE command is sent assuming BWP1's TA granularity, the command may not have been decoded successfully on the $1^{st}$ transmission, and a HARQ retransmission may be needed. However, before the retransmission is completed, the active BWP may switch from BWP1 to BWP2. In this situation, the UE may not know how to interpret the MAC-CE command's TA granularity (e.g., based on BWP1 or BWP2).

In some examples, the MAC-CE TA command ACK timing can be used to determine the BWP numerology to use. To avoid ambiguity, the gNB may defer BWP switching when MAC-CE with TA command is pending HARQ retransmission. If the HARQ retransmission completes and there is still a NACK, this implies that the TA command still did not get through. Thus, the gNB may determine to restart the MAC-CE TA command transmission in BWP1 and continue to defer switching to BWP2. Alternatively, the gNB may determine to restart the MAC-CE TA command transmission in BWP2 after switching from BWP1 to BWP2.

Dynamically changing the TA granularity in this manner may not be desirable due in part to difficulty in aligning the timing of the BWP switch command (based on DCI) and TA command (based on MAC CE).

According to certain aspects, the BS can reliably determine the TA granularity for the TA command in situations where the active BWP is dynamically changing.

In some examples, the BS may determine, for each of the one or more uplink carriers, a numerology associated with one or more configured BWPs of the uplink carrier. There may be multiple configured BWPs for each carrier, but one active BWP among the configured BWPs. Using PUL and SUL as a reference example, PUL may include one or more configured BWPs having different numerologies and SUL may include one or more configured BWPs having different numerologies. Once determined, the base station may determine the TA configuration to use for the TA command further based on the numerology of each configured BWP.

In some examples, the BS may determine the TA granularity of the TA command based on a maximum TA granularity of the BWPs or a minimum TA granularity of the BWPs. This determination can be done in a semi-statically manner, since in general the UL BWPs are RRC configured for the cell. Thus, even if the BWP is dynamically changing, the BS can use the same determined TA granularity for the TA command.

In some aspects, the BS may designate (or select) one of the UL BWPs as the "reference" UL BWP. For example, in TDD, the designated UL BWP can be the one associated with the default DL BWP. In another example, the designated UL BWP can be the one associated with a particular BWP index (e.g., index zero, or the minimum or the maximum among all the uplink BWP indices). The BS may determine the TA granularity of the TA command based on the TA granularity of the selected bandwidth part (determined from the reference UL BWP's numerology). The index of each BWP may be configured or reconfigured, for example, by RRC signaling, such that the TA granularity can be changed/updated when needed. Further, the BWPs may be indexed separately within each CC, or may be jointly indexed across all CCs. If separate indexing is used, multiple BWPs in different CCs may have the same index, and the designated UL BWP can then be the one associated with a particular BWP index within a particular carrier index.

Accordingly, aspects presented herein can be used to resolve the issue of the ambiguity with TA granularity in mixed UL numerology.

Example TA Command Interpretation for TAG with Mixed Numerologies

As described above, for uplink transmission, a timing advance (TA) is used to ensure that signals from different user equipment (UEs) generally arrive at the base station (BS) in a synchronous manner (e.g., are orthogonal) to avoid performance loss. As described above, in certain systems (e.g., such as 5G NR systems), the TA granularity (e.g., the units of the TA command) is based on one or more parameters associated with the numerology of the uplink carrier and, therefore, can be different for different numerologies. The term numerology refers to a set of parameters that define a structure of time and frequency resources used for communication. Such parameters may include, for example, the subcarrier spacing (SCS), the type of cyclic prefix (e.g., such as normal CP or extended CP), and/or the transmission time intervals (TTIs, e.g., such as subframe or slot durations). For example, a numerology with a larger SCS may be associated with a shorter symbol duration and a control timing with finer TA granularity (e.g., ability for finer timing adjustments), and a numerology with a smaller SCS may be associated with a longer symbol duration and coarser timing adjustments (e.g., larger timing adjustments as compared to numerologies having a larger SCS).

In some examples, a timing adjustment group (TAG) includes members or components associated with different numerologies (e.g., different SCS which may be referred to as tone spacing). Members of the TAG be associated with bandwidth parts (BWPs) and/or component carriers (CCs) that do not all share a common SCS. A single TA command is used for all of the members of the TAG (e.g., all BWPs and CCs). Unlike systems, such as long term evolution (LTE) systems, where the SCS is fixed (e.g., at 15 kHz), certain systems, such as 5G NR systems, support UL transmissions having different SCS (i.e., mixed numerologies). Thus, the TA command for the TAG may not ensure synchronous (e.g., orthogonal) reception at the BS due to the different numerologies associated with the TAG.

Aspects of the present disclosure provide methods and apparatus for members of a TAG having different numerologies to interpret a same TA command. In an example, the command may be interpreted as a same TA for all members of the TAG. Alternatively, and as described in more detail herein, the TA may be interpreted differently based on a numerology associated with the member of the TAG. For example, the TA command may be interpreted differently based on a SCS associated with a respective member of the TAG.

As described above, components or members of a TAG may have different tone spacing (i.e., different SCS). In some examples, the TA command granularity (e.g., units of the TA command) for a TAG is tied to or associated with a specific SCS, referred to as the "TAG SCS." The TAG SCS may be communicated to UEs (e.g., members of the TAG). In some examples, the TAG SCS is communicated to the UEs via RRC signaling. Accordingly, the TA command may indicate the TA granularity (e.g., units of TA) that is tied to the TAG SCS.

According to certain aspects, when a TAG is configured, all CCs and BWPs associated with the TAG and the TAG SCS to be used to determine the TA granularity may be identified. In some examples, the TAG SCS is based on the minimum/smallest SCS associated with a member of the TAG. Thus, the TA granularity for the TAG is tied to the smallest SCS for members of the TAG. The minimum SCS is associated with the largest OFDM symbol duration and the coarsest timing adjustment. Therefore, if the TA command granularity is associated with the minimum SCS, all members of the group will be able to apply the same TA command (no fractional TA will be applied by any member). This is because the minimum SCS is associated with the coarsest timing adjustment, which is a multiple of the finer granularity adjustments. In this case, UL transmissions associated with a larger SCS than the minimum SCS of the TAG are able to control timing with a finer granularity but may not do so because they are limited by the coarser granularity indicated in the TA command.

Associating the TA command with the minimum SCS for members of the TAG may be applied in the supplemental UL (SUL) scenario, where a single DL carrier is assigned to two UL carriers and each of the UL carriers have different numerologies. Similarly, a TA command associated with a minimum SCS may be applied to different CCs within a frequency band, or different BWPs in a system bandwidth, where the different CCs or BWPs have different numerologies.

According to certain aspects, the TA command granularity may be associated with an SCS other than the minimum SCS of the TAG (e.g., such as the maximum SCS of the TAG). It may be challenging to apply the granularity associated with the larger TAG SCS to members having of the TAG having an SCS that is smaller than the indicated TAG SCS. For example, application of the TA command for members of the TAG having an SCS less than the indicated TAG SCS may require timing adjustments that are a fraction of the natural TA granularity associated with the member (e.g., a fraction of a CC or BWP associated with the TAG member). Thus, members of the TAG associated with SCS smaller than the TAG SCS may natively support timing adjustments of coarser granularity as compared to the finer TAG command granularity.

According to certain aspects, when the TA command granularity (larger TAG SCS) is finer than the coarse granularity supported by a member (with a smaller SCS), the UE may round the TA command granularity to a natural TA granularity supported by the member. For example, for a CC or BWP of the TAG having a SCS that is smaller than the TAG SCS, the UE may round the granularity to the coarsest TA granularity supported by the CC or BWP. In some examples, the UE applies the rounded TA to all members of the TAG. This may have the same effect as using the SCS of the CC or BWP (that is less than the indicated TAG SCS) as the TAG SCS or as using the minimum SCS of all CC/BWPs in the TAG to define the TA granularity applicable to all members of the TAG.

According to other aspects, the TA command may be interpreted differently for different members of the TAG. In some examples, for members of the TAG with an SCS that is less than the TAG SCS, the UE may apply the rounded TA, for example, in an effort to avoid the applying a fraction of its natural TA granularity associated with the CC or BWP. Thus, the UE may interpret the TA command as the rounded TA command for members of the TAG (e.g., CCs/BWPs) that have the smaller SCS. The finer granularity associated with the TA command may be preserved and used/applied by members of the TAG having a SCS that is equal to or larger than the TAG SCS. Thus, the same TA command may be interpreted differently for different members of the TAG having different numerologies and may avoid any member applying a fractional portion of the member's natural TA granularity.

For members of the TAG having an SCS less than the TAG SCS, additional actions may be taken to help maintain synchronization of received UL transmissions at the BS. According to certain aspects, the UE may track a rounding error between the TA command granularity and the (rounded) TA applied to a member. For example, instead of simply processing future TA commands, the rounding error or difference may be applied to future UL transmissions. In some examples, the UE may recognize that a quantized version of a TA command was applied to the member, determine the error due to the quantization, and accumulate the quantization error with a next command or next UL transmission in an effort to avoid errors from accumulating. Tracking the difference and applying it to future UL transmissions helps UL transmissions from the TAG remain time-aligned. In some examples, the UE may apply the difference to a next or later-received TA command. In some examples, the UE autonomously applies the difference based on a determined change in DL timing at the UE. A change in DL timing at the UE may occur, for example, when the UE is moving, either further away from the BS or closer to the BS. Autonomous application refers to the UE applying the error to subsequent UL transmissions absent receiving an explicit TA command.

According to certain aspects, errors or differences may be included or excluded from computations regulating the UE's DL timing-based UL adjustments (e.g., limits on per-instantaneous adjustment and on rate of adjustment over time). A UE may be able to make a limited number of instantaneous adjustments or a limited number of adjustments in a given time window. Application of the accumulation errors may or may not contribute to these limits Certain events may reset the tracking of the rounding errors (differences). In some examples, based on triggering events, the accumulated rounded error may be reset. In some examples, because the difference between the TA command granularity and the applied TA was based on a SCS, a reconfiguration of BWPs and/or CCs or a change in SCS may trigger resetting the accumulation of differences. In some examples, a change in the TAG SCS may trigger resetting the errors. In some examples, an explicit reset command transmitted via RRC signaling or a MAC-CE may force a reset of errors. Expiry of a TA-timer may indicate link failure. In some examples, the UE may begin a RACH procedure or make limited transmissions upon expiry of the TA-timer, and the UE may reset the error when the TA-timer expires.

According to certain aspects, the options described herein for interpreting a TA command may depend on the UE's capability and RRC configuration.

Figure 9:
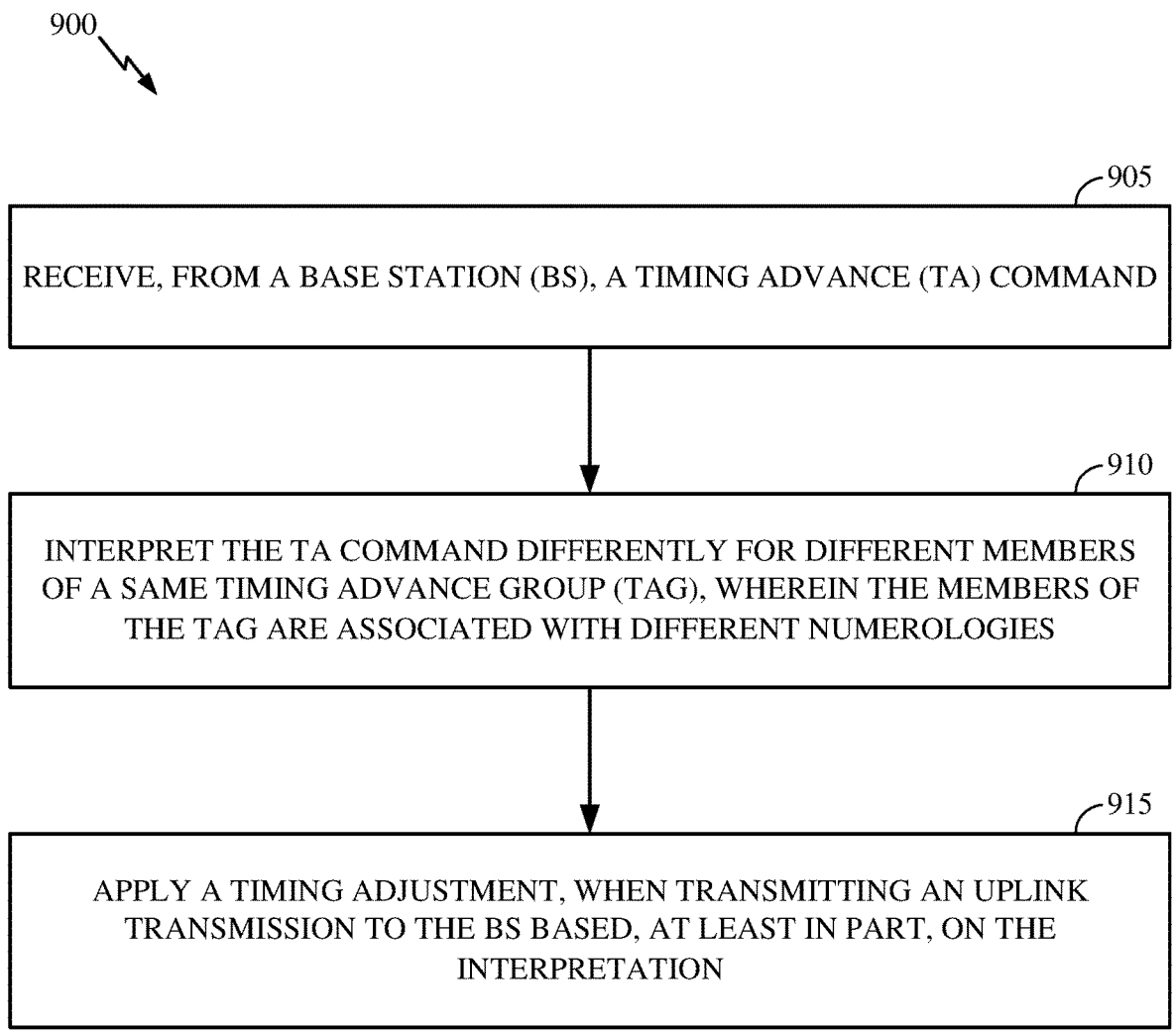
FIG. 9 is a flow diagram illustrating example operations for wireless communications by a UE, in accordance with certain aspects of the present disclosure.

FIG. 9 illustrates example operations 900 that may be performed by a UE, in accordance with aspects of the present disclosure. The UE may include one or more components illustrated in FIG. 4. Operations 900 may be implemented as software components that are executed and run on one or more processors (e.g., processor 480 of FIG. 4). Further, the transmission and reception of signals by the UE in operations 900 may be enabled, for example, by one or more antennas (e.g., antennas 452 of FIG. 4). In certain aspects, the transmission and/or reception of signals by the UE may be implemented via a bus interface of one or more processors (e.g., processor 480) obtaining and/or outputting signals.

At 905, the UE may receive, from a BS, a TA command. As described above, a TA granularity of a TA command is associated with an SCS. The TA granularity is defined by any combination of predetermined rules (e.g., agreed upon in a standard) and/or RRC signaling. As an example, the granularity may be hardwired into the UE (e.g., defined in a technical standard supported by the UE). The formula may be based on a function of the numerology, such as the SCS.

At 910, the UE may interpret the TA command differently for different members of a same TAG, wherein the members of the TAG are associated with different numerologies. In some examples, the numerologies may be associated with different SCS. Based on the SCS of a member and a received TAG SCS, the UE may round the TA granularity in a received TA command. The UE may compare the SCS of the member to the SCS associated with the TA granularity (e.g., the TAG SCS). Based on the comparison, the UE may interpret the TA command. Members of the TAG may include one or more CCs and/or one or more BWPs.

At 906, the UE may apply a timing adjustment when transmitting an uplink transmission to the BS based, at least in part, on the interpretation. In some examples, the UE may apply the determined timing adjustment to the member, or apply the TA granularity as indicated in the command.

The UE may apply the timing adjustment by applying the TA command differently based on the SCS associated with a respective member of the TAG. For example, when the SCS is less than an indicated SCS of the TA granularity, the UE may apply the rounded granularity of the TA command. The rounded granularity may be a nominal coarse TA that is larger than the TA associated with the TA command. In another example, when the SCS of a member of the TAG is not an integer multiple of the indicated SCS of the TA granularity, the UE may apply the rounded granularity of the TA command.

On the other hand, when an SCS of a member of the TAG is greater than or equal to the indicated SCS of the TA granularity UE may apply the TA granularity indicated in the TA command (e.g., no rounding). In another example, when the SCS of a member of the TAG is an integer multiple of the indicated SCS of the TA granularity, the UE may apply the TA granularity indicated in the TA command without rounding.

When the UE applies a rounded TA granularity, the UE may track differences between the TA granularity associated with the indicated subcarrier SCS and the nominal coarse TA granularity applied. The difference may be applied to subsequent TA commands. The difference may be applied autonomously by the UE. Accumulated differences may be reset, for example, upon reconfiguration of members of the TAG, a change in the indicated SCS, a received command from the BS, and/or upon expiry of a TA-timer.

As described herein, components (e.g., members) of a TAG may be associated with different numerologies. To maintain synchronization of received signals at a BS, members of a TAG may apply different interpretations of a TA command. The interpretation may be based, at least in part, on a numerology associated with each member and a TAG SCS which is associated with a TA granularity for the TAG.

The example described above discuss, for simplicity, that rounding of the TA commands is done for CCs and/or BWPs with SCS smaller than the TAG SCS, and is not done otherwise. However, the concepts described above are not limited by these examples, and are readily extended to other examples of when rounding is, or is not, done. For example, the UE may apply the TA command without rounding, and/or accumulation of rounding errors, even to certain CCs and/or BWPs with SCS less than TAG SCS. In some examples, the set of CCs and/or BWPs for which the UE is able to directly apply the TA command may be communicated with the BS, for example, as part of UE capability signaling, and the UE may be allowed to apply the TA command without rounding for CCs or BWPs within that set. In some examples, for SCS that is not a multiple of all the smaller allowed SCS (i.e., the ratio of any two SCS is not necessarily a power of 2), rounding may be done even for BWPs and/or CCs whose SCS is equal or greater than the TAG SCS (e.g., the SCS is not a multiple of the TAG SCS).

According to certain aspects, rounding may include rounding the TA command down (e.g., flooring), rounding the TA command up (e.g., ceiling), or rounding the TA command to the nearest supported granularity. The TA may be rounded such that the rounded TA may is an integer multiple of the TA granularity associated with the SCS of a member of the TAG.

In some examples, the TA command prior to rounding may be equally close to the nearest supported granularities obtained by rounding down or rounding up. The UE may round down, round up, or be configured regarding how to round received TA commands (TA granularity). The UE may randomly determine, for each TA command, whether it will round up or round down the TA granularity. The UE may select, via a deterministic pattern across a number of received TA commands, for example, a number of successively received TA commands, whether it will round up or round down. For example, the UE may alternate between rounding up or rounding down the granularity to be applied.

The choice between the various possible rounding behaviors described above may also be a function of whether or not the UE accumulates its rounding errors, and/or the UE capability.

According to certain aspects, a BS may perform operations complementary to the operations 900 that may be performed by the UE.

Figure 10:
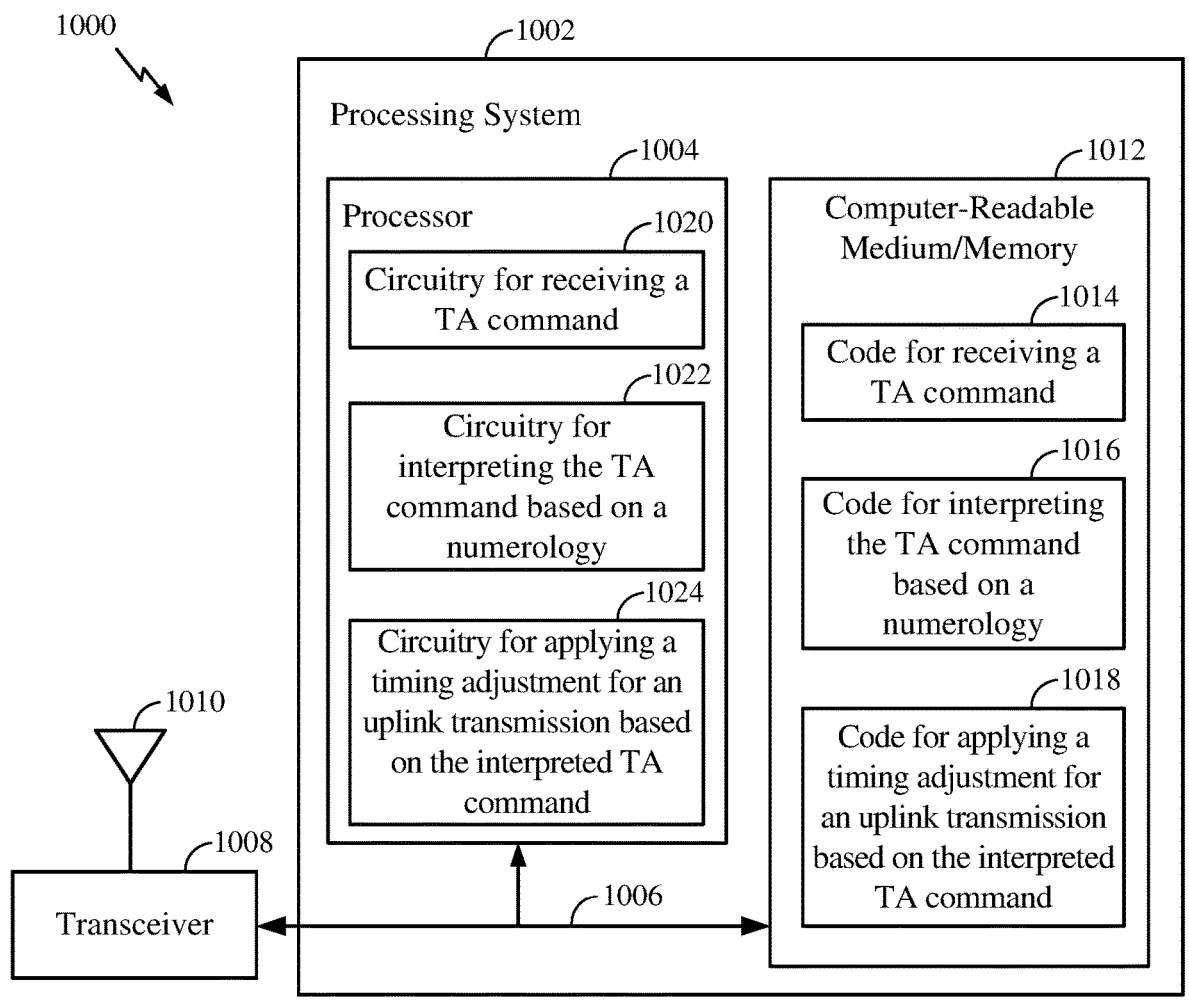
FIG. 10 illustrates a communications device that may include various components configured to perform operations for the techniques disclosed herein in accordance with aspects of the present disclosure.

FIG. 10 illustrates a communications device 1000 that may include various components (e.g., corresponding to means-plus-function components) configured to perform operations for the techniques disclosed herein, such as the operations illustrated in FIG. 9. The communications device 1000 includes a processing system 1002 coupled to a transceiver 1008. The transceiver 1008 is configured to transmit and receive signals for the communications device 1000 via an antenna 1010, such as the various signals as described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions (e.g., computer-executable code) that when executed by the processor 1004, cause the processor 1004 to perform the operations illustrated in FIG. 9, or other operations for performing the various techniques discussed herein for TA adjustment for mixed numerologies. In certain aspects, computer-readable medium/memory 1012 stores code 1014 for receiving a TA command; code 1016 for interpreting the TA command based on numerology; and code 1018 for applying a timing adjustment for an uplink transmission based on the interpreted TA command. In certain aspects, the processor 1004 has circuitry configured to implement the code stored in the computer-readable medium/memory 1012. The processor 1004 includes circuitry 1020 for receiving a TA command; circuitry 1022 for interpreting the TA command based on numerology; and circuitry 1024 for applying a timing adjustment for an uplink transmission based on the interpreted TA command.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving, from a base station (BS), a timing advance (TA) command;
   rounding the TA command to a TA granularity for a member of a timing advance group (TAG), wherein the TA granularity of the TA command is associated with a subcarrier spacing (SCS) and members of the TAG associated with different numerologies comprise one or more members associated with different SCSs and wherein rounding the TA command to TA granularity comprises rounding the TA command based on an SCS associated with the member of the TAG and rounding the TA command up or down to a nearest supported granularity; and
   applying a timing adjustment when transmitting an uplink transmission to the BS based, at least in part, on the rounded TA command.

2. The method of claim 1, wherein the SCS is the largest SCS in the TAG.

3. The method of claim 1, wherein the members of the TAG comprise one or more component carriers or one or more bandwidth parts.

4. The method of claim 1, wherein applying the timing adjustment comprises applying the TA command differently based on an SCS associated with each member of the TAG.

5. The method of claim 1, wherein:
   a SCS of a first member of the TAG is not an integer multiple of the SCS of the TA granularity, and
   rounding the TA command-comprises rounding the TA command to a granularity applied to the first member.

6. The method of claim 5, wherein rounding the TA command comprises:
   determining a TA based on an indicated largest SCS of the TAG, and
   rounding the first TA to a second TA.

7. The method of claim 5, wherein rounding the TA command comprises one or more of:
   rounding the TA command down to a nearest supported granularity,
   rounding the TA command up to a nearest supported granularity, or
   randomly rounding the TA command up or down to a nearest supported granularity.

8. The method of claim 7, wherein rounding the TA command to a granularity comprises determining the rounding of the TA command up or down to a nearest supported granularity based on a deterministic pattern of multiple received TA commands.

9. The method of claim 1, wherein:
   an SCS of a first member of the TAG is not an integer multiple of the SCS of the TA granularity, and
   rounding the TA command to the TA granularity comprises rounding a granularity applied to the first member to a nominal coarse TA granularity larger than the TA granularity.

10. The method of claim 9, further comprising tracking a difference between the TA granularity associated with the SCS and the nominal coarse TA granularity applied to the first member of the TAG.

11. The method of claim 10, further comprising applying the difference to a future TA command.

12. The method of claim 10, further comprising:
   determining a change in downlink timing at the UE; and
   autonomously applying the difference based, at least in part on the determination, to UL transmission to the BS.

13. The method of claim 10, further comprising resetting the difference based on at least one of: a reconfiguration of members of the TAG, a change in the SCS, a received command from the BS, or expiry of a TA-timer.

14. The method of claim 1, wherein:
   an SCS of a second member of the TAG is an integer multiple of the SCS of the TA granularity; and
   applying the timing adjustment comprises applying the TA granularity to the second member.

15. The method of claim 1, wherein the members of the TAG associated with different numerologies comprise at least one of: component carriers (CCs) or bandwidth parts (BWPs) having different SCS.

16. An apparatus for wireless communications, comprising:
- means for receiving, from another apparatus, a timing advance (TA) command;
- means for rounding the TA command to a TA granularity for a member of a timing advance group (TAG), wherein the TA granularity of the TA command is associated with a subcarrier spacing (SCS) and members of the TAG associated with different numerologies comprise one or more members associated with different SCSs and wherein rounding the TA command to TA granularity comprises rounding the TA command based on an SCS associated with the member of the TAG and rounding the TA command up or down to a nearest supported granularity; and
- means for applying a timing adjustment when transmitting an uplink transmission to the another apparatus based, at least in part, on the rounded TA command.

17. The apparatus of claim 16, wherein the SCS is the largest SCS in the TAG.

18. The apparatus of claim 16, wherein the members of the TAG comprise one or more component carriers or one or more bandwidth parts.

19. The apparatus of claim 16, wherein applying the timing adjustment comprises applying the TA command differently based on an SCS associated with each member of the TAG.

20. The apparatus of claim 16, wherein:
- a SCS of a first member of the TAG is not an integer multiple of the SCS of the TA granularity, and
- rounding the TA command to the TA granularity comprises rounding the TA command to a granularity applied to the first member.

21. The apparatus of claim 20, wherein rounding the TA command comprises:
- determining a TA based on an indicated largest SCS of the TAG, and
- rounding the first TA to a second TA.

22. The apparatus of claim 20, wherein rounding the TA command comprises one or more of: rounding the TA command down to a nearest supported granularity, rounding the TA command up to a nearest supported granularity, or randomly rounding the TA command up or down to a nearest supported granularity.

23. The apparatus of claim 16, wherein:
- an SCS of a first member of the TAG is not an integer multiple of the SCS of the TA granularity, and
- rounding the TA command to the TA granularity comprises rounding a granularity applied to the first member to a nominal coarse TA granularity larger than the TA granularity of the TA command.

24. The apparatus of claim 23, further comprising tracking a difference between the TA granularity associated with the SCS and the nominal coarse TA granularity applied to the first member of the TAG.

25. The apparatus of claim 24, further comprising means for applying the difference to a future TA command.

26. The apparatus of claim 16, wherein:
- an SCS of a second member of the TAG is an integer multiple of the SCS of the TA granularity; and
- applying the timing adjustment comprises applying the TA granularity to the second member.

27. An apparatus for wireless communications, comprising:
- a receiver configured to receive, from another apparatus, a timing advance (TA) command;
- at least one processor coupled with a memory and configured to:
  - round the TA command to a TA granularity for a member of a timing advance group (TAG), wherein the TA granularity of the TA command is associated with a subcarrier spacing (SCS) and members of the TAG associated with different numerologies comprise one or more members associated with different SCSs and wherein rounding the TA command to TA granularity comprises rounding the TA command based on an SCS associated with the member of the TAG and rounding the TA command up or down to a nearest supported granularity; and
  - apply a timing adjustment when transmitting an uplink transmission to the another apparatus based, at least in part, on the rounded TA command.

28. A computer readable non-transitory medium having computer executable code stored thereon for wireless communications, comprising:
- code for receiving, from an apparatus, a timing advance (TA) command;
- code for rounding the TA command to a TA granularity for a member of a timing advance group (TAG), wherein the TA granularity of the TA command is associated with a subcarrier spacing (SCS) and members of the TAG associated with different numerologies comprise one or more members associated with different SCSs and wherein rounding the TA command to TA granularity comprises rounding the TA command based on an SCS associated with the member of the TAG and rounding the TA command up or down to a nearest supported granularity; and
- code for applying a timing adjustment when transmitting an uplink transmission to the apparatus based, at least in part, on the rounded TA command.

* * * * *